(12) United States Patent
Yoshihara et al.

(10) Patent No.: US 7,489,677 B2
(45) Date of Patent: Feb. 10, 2009

(54) EXCHANGE EQUIPMENT

(75) Inventors: Toru Yoshihara, Koriyama (JP); Shinya Suzuki, Koriyama (JP); Kazunori Katagiri, Koriyama (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 1030 days.

(21) Appl. No.: 10/762,577

(22) Filed: Jan. 23, 2004

(65) Prior Publication Data
US 2004/0208192 A1 Oct. 21, 2004

(30) Foreign Application Priority Data
Jan. 24, 2003 (JP) .............. 2003-016425

(51) Int. Cl.
*H04L 12/66* (2006.01)
(52) U.S. Cl. ............ 370/352; 370/401
(58) Field of Classification Search ............. 370/352
See application file for complete search history.

(56) References Cited

U.S. PATENT DOCUMENTS

| 7,167,486 | B2* | 1/2007 | Cornelius et al. | 370/467 |
| 7,239,629 | B1* | 7/2007 | Olshansky et al. | 370/353 |
| 7,272,135 | B1* | 9/2007 | Ohtsu et al. | 370/356 |
| 2003/0072330 | A1* | 4/2003 | Yang et al. | 370/493 |
| 2003/0095542 | A1* | 5/2003 | Chang et al. | 370/352 |

FOREIGN PATENT DOCUMENTS

JP 11-191791 A 7/1999

\* cited by examiner

*Primary Examiner*—Creighton H Smith
(74) *Attorney, Agent, or Firm*—Foley & Lardner LLP

(57) ABSTRACT

Since in a system of the invention comprising a TU portion 1*b* for accommodating general extension telephones 5 and PSTN 8, and a TM portion 1*a* for performing a call control with a packet network, call control information from the PSTN 8 and the like to the packet network is received by the TU portion 1*b* and then transferred to the TM portion 1*a* and converted into call control data adapted to the packet network, and voice data from the PSTN 8 and the like to the packet network is received by the TU portion 1*b* and then converted into voice data adapted to the packet work, it is possible to use a packet network such as the Internet, convert voice data into IP packet data and thereby provide a communication service equivalent to a conventional circuit switching service at low cost.

8 Claims, 10 Drawing Sheets

Fig.3

No.7 MESSAGE TABLE

| EXPLANATION | MSG | EXPLANATION | MSG |
|---|---|---|---|
| ADDRESS SIGNAL WITH ADDITIONAL INFORMATION | IAI | LINK RECONNECT SIGNAL | LCM |
| ADDRESS COMPLETION SIGNAL WITH ADDITIONAL INFORMATION | ACI | TRANSFER SIGNAL | TRM |
| ANSWER SIGNAL WITH ADDITIONAL INFORMATION | AND | INCOMPLETION NOTIFICATION SIGNAL | EUM |
| DISCONNECT SIGNAL | CLF | FORWARD TRANSFER SIGNAL | FOT |
| RECOVERY COMPLETION SIGNAL | RLG | CHANNEL GROUP CONGESTION SIGNAL | CGC |
| SUBSCRIBER BUSY SIGNAL | SSB | CHANNEL FAILURE SIGNAL | CFL |
| CLEARING SIGNAL | CBK | ACCOUNTING INFORMATION CONTROL SIGNAL | ESM |
| CHANNEL RESET SIGNAL | RSC | BLOCKING SIGNAL | BLO |
| SERVICE SET-UP SIGNAL | SSM | BLOCKING CONFIRMATION SIGNAL | BLA |
| SERVICE STATUS CHECK SIGNAL | SSC | UNBLOCKING SIGNAL | UBL |
| SERVICE CONTROL SIGNAL | SVC | UNBLOCKING CONFIRMATION SIGNAL | UBA |
|  |  |  |  |
| ADDRESS SIGNAL | AIM |  |  |
| ADDRESS COMPLETION SIGNAL | ACM |  |  |
| REPEATER STAND FREE LINE MONITORING CONNECTION SIGNAL | ACP |  |  |
| BACKWARD SERVICE STATUS CHECK SIGNAL | BSM |  |  |
| ACCOUNTING INFORMATION CONTROL SIGNAL | ESM |  |  |
| INTER-NODE ADDRESS SIGNAL | NIA |  |  |

120 — ADDRESS SIGNAL WITH ADDITIONAL INFORMATION
121 — ADDRESS COMPLETION SIGNAL WITH ADDITIONAL INFORMATION
122 — ANSWER SIGNAL WITH ADDITIONAL INFORMATION
123 — DISCONNECT SIGNAL
124 — RECOVERY COMPLETION SIGNAL
125 — SUBSCRIBER BUSY SIGNAL

Fig.4

H.323 (H.225) MESSAGE TABLE

| CALL SET-UP MESSAGES | | OTHER MESSAGES | |
|---|---|---|---|
| CALLING | Alerting | CONGESTION CONTROL | Congestion |
| CALL SET-UP RECEPTION | Call | ADDITIONAL INFORMATION | Information |
| ANSWER | Connect | NOTIFICATION | Notify |
| ANSWER CONFIRMATION | Connect | STATUS DISPLAY | Status |
| PROGRESS DISPLAY | Progress | STATUS INQUIRY | Status |
| CALL SET-UP | Setup | JT-Q932/JT-H450 MESSAGES | |
| CALL SET-UP CONFIRMATION | Setup | FACILITY | facility |
| CALL END MESSAGES | | HOLD | Hold |
| DISCONNECTION | Disc | HOLD CONFIRMATION | Hold |
| RELEASE | Rel comp | HOLD REJECT | Hold Reject |
| RELEASE COMPLETION | Rel comp | HOLD RELEASE | Retrieve |
| CALL INFORMATION PHASE MESSAGES | | HOLD RELEASE CONFIRMATION | Retrieve |
| RESUME | Resume | HOLD RELEASE REJECT | Retrieve |
| RESUME CONFIRMATION | Resume | | |
| RESUME REJECT | Resume | | |
| SUSPEND | Suspend | | |
| SUSPEND CONFIRMATION | Suspend | | |
| SUSPEND REJECT | Suspend | | |
| USER INFORMATION | User | | |

Fig.5

No.7/H.323 CONVERSION MESSAGE CORRESPONDENCE TABLE

| | No.7 MESSAGES | | DIRECTION | H.323 MESSAGES | |
| --- | --- | --- | --- | --- | --- |
| | | | | H.225 | |
| | MSG | EXPLANATION | | MSG | EXPLANATION |
| 140 → | IAI | ADDRESS SIGNAL WITH ADDITIONAL INFORMATION | ⇔ | Setup | CALL SET-UP |
| 141 → | ACI | ADDRESS COMPLETION SIGNAL WITH ADDITIONAL INFORMATION | ⇔ | Alerting | CALLING |
| 142 → | AND | ANSWER SIGNAL WITH ADDITIONAL INFORMATION | ⇔ | Connect | ANSWER |
| | SSB | SUBSCRIBER BUSY SIGNAL | ⇔ | Rel comp | RELEASE COMPLETION |
| | CLF | DISCONNECT SIGNAL | ⇔ | Rel comp | RELEASE COMPLETION |
| | RLG | RECOVERY COMPLETION SIGNAL | ⇔ | Rel comp | RELEASE COMPLETION |
| | CBK | CLEARING SIGNAL | | Rel comp | DISCONNECT-RELATED SIGNAL |
| | RSC | CHANNEL RESET SIGNAL | | Rel comp | DISCONNECT-RELATED SIGNAL |
| | SSM | SERVICE SET-UP SIGNAL | | — | ADDITIONAL SERVICE-RELATED SIGNAL |
| | SSC | SERVICE STATUS CHECK SIGNAL | | — | ADDITIONAL SERVICE-RELATED SIGNAL |
| | SVC | SERVICE CONTROL SIGNAL | | — | ADDITIONAL SERVICE-RELATED SIGNAL |
| | LCM | LINK RECONNECT SIGNAL | | — | ADDITIONAL SERVICE-RELATED SIGNAL |
| | TRM | TRANSFER SIGNAL | | Rel comp | ADDITIONAL SERVICE-RELATED SIGNAL |
| | EUM | INCOMPLETION NOTIFICATION SIGNAL | | — | ADDITIONAL SERVICE-RELATED SIGNAL |
| | FOT | FORWARD TRANSFER SIGNAL | | — | ADDITIONAL SERVICE-RELATED SIGNAL |
| | CGC | CHANNEL GROUP CONGESTION SIGNAL | | — | ADDITIONAL SERVICE-RELATED SIGNAL |
| | CFL | CHANNEL FAILURE SIGNAL | | — | ADDITIONAL SERVICE-RELATED SIGNAL |
| | BLO | BLOCKING SIGNAL | | — | ADDITIONAL SERVICE-RELATED SIGNAL |
| | BLA | BLOCKING CONFIRMATION SIGNAL | | | ADDITIONAL SERVICE-RELATED SIGNAL |

EXCHANGE EQUIPMENT

CROSS-REFERENCES OF RELATED APPLICATION

This application claims all benefits accruing 35 U.S.C 119 from the Japanese Patent Application No.2003-16425, filed on Jan. 24, 2003.

BACKGROUND OF THE INVENTION

1. Field of the Invention

The present invention relates to an exchange making terminal apparatuses communicate with one another, said terminal apparatuses being connected to a packet network such as the Internet, an intranet of a private LAN and the like, and connected to a public circuit switching network.

2. Description of the Related Art

The most apparatuses used in a present public telephone network are analog telephones. And an exchange (PBX: private branch exchange) connected to a public telephone network has many special functions so as to provide various services by connecting an analog telephone directly to the PBX as an extension telephone.

On the other hand, voice communication using the Internet (Voice over Internet Protocol: VoIP) can be performed by connecting a public telephone network and the Internet to each other through an exchange (see Patent literature 1: Japanese Patent Laid-Open Publication No.Hei 11-191,791 (FIG. 1), for example).

Also in such a situation, however, it is necessary to accommodate a public telephone network, an extension telephone, the Internet, a terminal 61 adapted to ITU-T Recommendation H.323 (hereinafter, referred to as an IP telephone) and the like, and perform a process of address-converting a called telephone number into a number on a packet network, a calling process, a call connection process and the like also in a packet switching network such as the Internet, and it is necessary also to apply an SS7 signaling signal to a packet switching network (in a conventional public telephone network, a call is transmitted by an SS7 signaling (hereinafter, referred to as No.7) signal until an end office takes part in the call and is managed by each end office).

And there has been needed an exchange capable of being inexpensively adapted to also the case of building a system of only digital data communication using a packet network such as the Internet.

BRIEF SUMMARY OF THE INVENTION

The present invention has been performed in consideration of the above-mentioned situation and aims at providing an exchange which has functions of a conventional exchange and furthermore can be connected to a packet network such as the Internet, can be adapted to a system configuration of only a packet (IP) network such as a LAN using no conventional analog telephone and also can be easily adapted at the minimum equipment to a hybrid system integrating a packet (IP) network and an existing public network with each other and enabling an analog telephone to be used.

According to the present invention, there is provided an exchange for accommodating and connecting extension telephones and a public network to a packet network through a line concentrator, said exchange comprising a call control portion for managing call control information and a channel accommodation portion for accommodating said extension telephones and said public network, wherein said call control portion and said call accommodation portion are connected by said packet network, and said call control portion transfers data received from said channel accommodating portion to a specified opposite party according to call control information received from said channel accommodating portion.

According to the present invention, as described above, also in a packet switching network such as the Internet, it is possible to perform management of communication data such as checking whether or not a called number is a registered telephone number, connection of the call, providing status information such as a ring-back tone and the like to a calling party, judging whether or not a called party has answered and the like and thereby smoothly perform the connection between a conventional public network and a packet network.

And in case of building a system composed of only a packet network, it is possible to build a full-IP network by arranging only a TM portion for performing a call control, and in case of building a hybrid system accommodating a packet network and additionally office lines and analog extension telephones, it is possible to build such a system by only additionally installing a TU portion for accommodating the channels. The TU portion can be installed more according to the number of lines and can be flexibly adapted to various systems ranging from a small-scale system to a large-scale system.

BRIEF DESCRIPTION OF THE SEVERAL VIEWS OF THE DRAWINGS

FIG. 3 shows a table of No.7 common channel signaling messages.

FIG. 4 shows a table of H.323 messages.

FIG. 5 shows the correspondence of conversion between No.7 common channel signaling messages and H.323 messages.

DETAILED DESCRIPTION OF THE INVENTION

Figure 1:
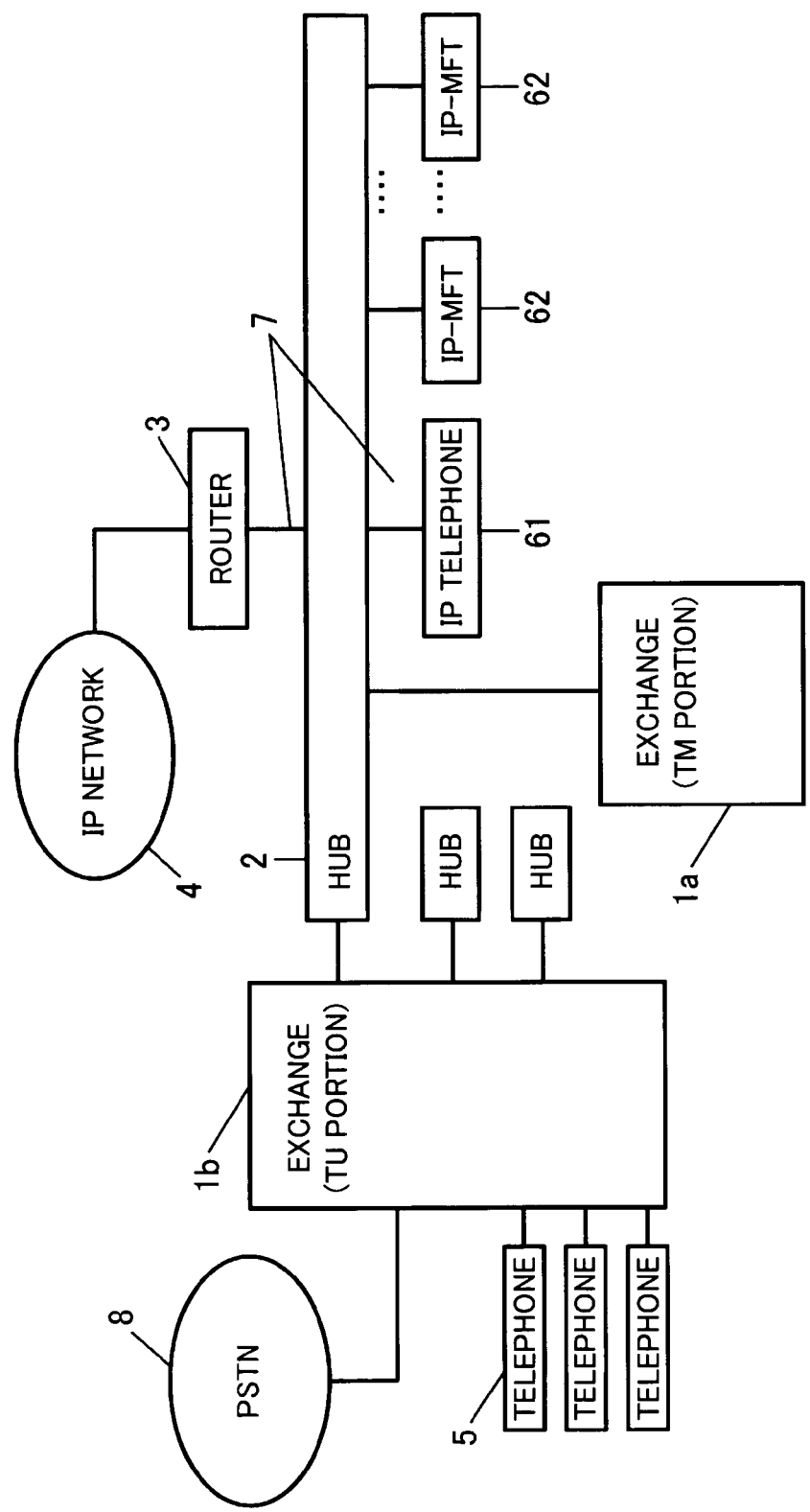
FIG. 1 is a system configuration diagram using an exchange of the present invention.

FIG. 1 shows a system configuration using an exchange of the present invention.

An exchange 1 according to the present invention is; composed of a call control portion 1a (hereinafter, referred to as a TM portion) and a channel accommodating portion 1b (hereinafter, referred to as a TU portion), and the TU portion 1b is connected to a public switching network 8 (hereinafter, referred to as a PSTN: public switched telephone network) and accommodates plural analog terminals 5 (hereinafter, referred to as telephones) and plural hubs HUB 2 for LAN (local area network) communication.

A Hub HUB 2 being a line concentrator has a TM portion 1a, a terminal 61 adapted to ITU-T. Recommendation H.323 (hereinafter, referred to as an IP telephone), an IP multifunction telephone 62 (hereinafter, referred to as an IP-MFT)

having a specific interface with the exchange 1 and a router 3 being a general IP router connected to it through in-house or private LAN cables 7.

The router 3, which is a network apparatus for connecting different networks to each other, relays digital data (voice and the like) to a destination network according to a routing table having communication routes described in it. The exchange 1 is connected to an Internet Protocol network 4 (hereinafter, referred to as an IP network) through the router 3.

TM portion 1*a*, IP telephone 61 and IP-MFT 62 are connected to each other through a LAN and voice signals, mails and various kinds of information (telephone numbers, IP addresses, mail addresses and the like) are transmitted by means of IP packets.

TU portion 1*b* enables extension telephone 5 or PSTN 8 to be connected to a LAN or IP network 4 being a packet network under control of TM portion 1*a*, and can be installed optionally more in number according to the number of channels or extension telephones.

The TU portion 1*b* performs an operation of converting call control information and analog voice from a telephone 5 or the like into IP packet data and sending out them to the TM portion 1*a* and LAN, and an operation of receiving and converting IP packet data from the TM portion 1*a* or LAN into an analog voice.

Figure 2:
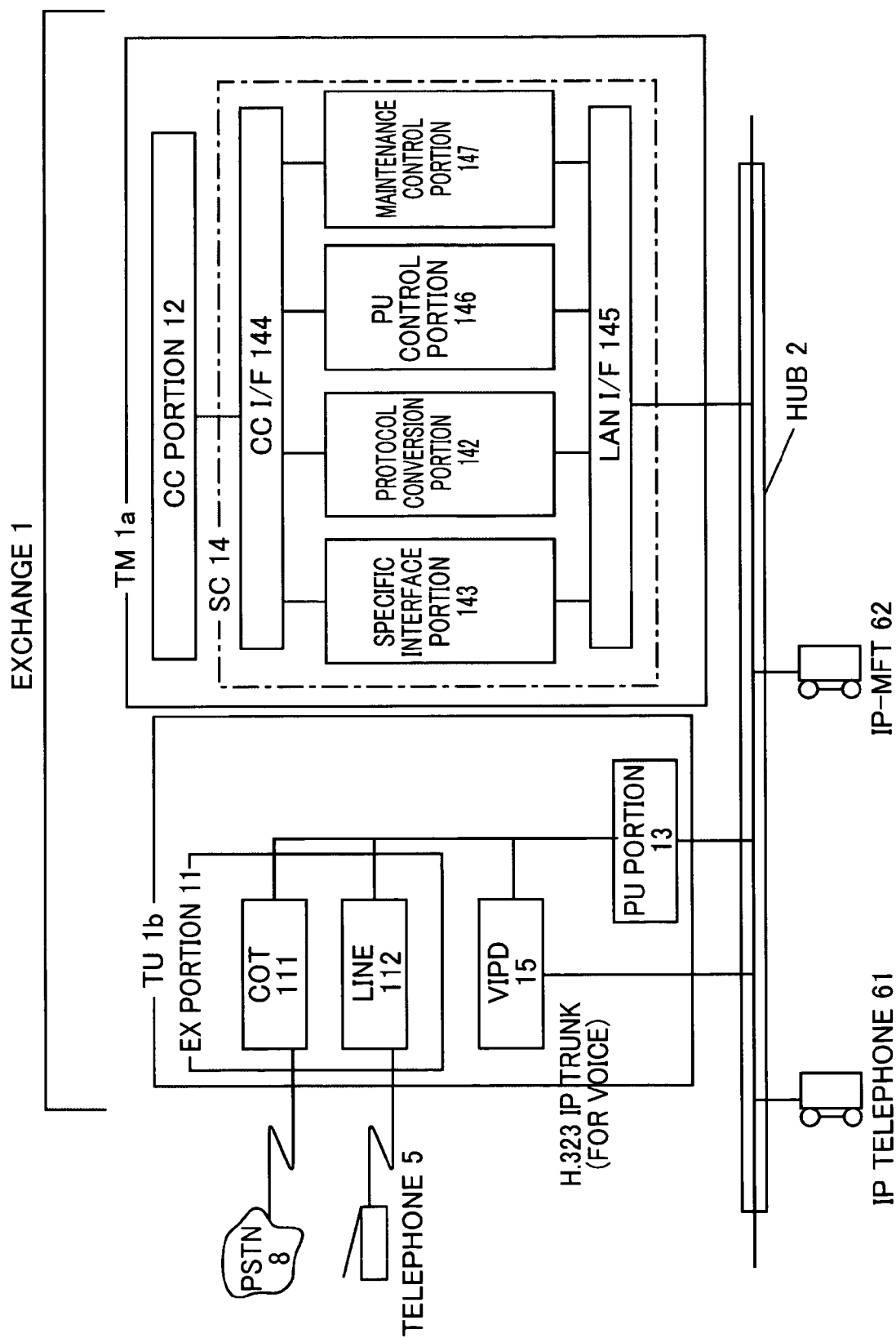
FIG. 2 is an internal block diagram of an exchange of the present invention.

FIG. 2 shows an internal block diagram of an exchange 1 of the present invention.

TU portion 1*b* is provided inside it with a conventional channel portion 11 (hereinafter, referred to as an EX portion) for realizing the same function as a conventional telephone exchange function and a packet processing portion 13 (hereinafter, referred to as a PU portion) for performing the conversion between voice data from EX portion 11 and packet data.

EX portion 11 being a conventional channel portion is provided inside it with an office line interface portion 111 (hereinafter, referred to as a COT) for making an electrical interface compatible and communicating with PSTN 8 and a telephone interface portion 112 (hereinafter, referred to as a LINE) for making an electrical interface compatible and communicating with telephone 5.

PU portion 13 performs a voice conversion under control of a CC portion 12 (described later). The PU portion 13 has a voice compressing function, an operation regulation processing function of G.723.1, a voice packet processing function, a fluctuation absorbing control function, a synchronism compensating function, a DTMF transparent function, a priority control function, a silence suppressing function, and a communication interrupt monitoring function. The voice compressing function of performing performs the compression or expansion of voice data by means of a coding method (G.711, G.729 and G.723.1). The G.723.1 operation prescription processing function regulates an incoming or outgoing call by judging whether or not selection is to be performed according to the existence or inexistence of G.723.1. The voice packet processing function performs a process of multiplexing packets (a packet generating/analyzing process adapted to different payload types (hereinafter, referred to as PT) such as various coding systems/fax/modem etc.). The fluctuation absorbing control function prevents the interruption of sound to be caused by fluctuation in a LAN or between networks. The synchronism compensating function adjusts the slippage in synchronism occurring between apparatuses being opposite to each other. The DTMF transmitting function transmits or receives a DTMF signal being under communication in a code system other than a voice signal. The priority control function allows communication according to the priority order of packet data determined in order to avoid the interruption of voice to be caused by fluctuation or delay in a network in case that voices and data are intermingled on the same LAN. The silence suppressing function detects a silent state during conversation, stops sending out packet data during the period of silence, and thereby reduces traffic on the LAN. The communication interrupt monitoring function, in case that a packet communication with an opposite party is made unable due to a channel failure and the like, performs a process of releasing the call as an invalid call.

And it has an each channel connecting condition management function of managing a coding method enabling connection and the number of multiplexed packets defined for each channel and judging whether or not the connection of a call is to be accepted under the conditions, and a channel status managing function of managing the status of call in each channel and thereby judging whether or not an incoming call is to be accepted.

A voice priority control function is a function which does not send packets received by a LAN apparatus in order of reception but gives the priority order to the packets by packet types and send the packets in order of descending priority, and in a LAN apparatus used in a network configuration where voice and data systems are intermingled, in order to reduce the delay of transmission of a voice system, a voice packet is transferred by the highest priority utilizing this function.

When there are many packets being high in priority, a packet being low in priority suffers "a large amount of delay" or is "discarded", but this influences little on a data system since generally the traffic volume of a voice system is far smaller than the traffic volume of a data system.

In case that a server system being particularly large in traffic volume among data systems and a voice system share a communication route, the voice priority control is an indispensable function.

The voice priority control corresponds to the priority control in layer 2 (IEEE 802.1Q/p). As for details of this, IEEE 802.Q is a standard of giving a VLAN tag (4 bytes) to an ordinary MAC frame (IEEE 802.1D) (a VLAN number is specified by VID bits in a VLAN tag), and IEEE 802.1p is shown in a standard of determining the order of priority using the user priority bits in a VLAN tag. And additionally to this, a priority control by layer 3 (IP address) or layer 4 (TCP, UDP port number) can be performed.

Additionally, as described above, since the TU portion 1*b* is provided with a band control function, a fragment function and a fluctuation absorbing function, these are described in detail in the following.

First, the band control function is a function of securing a band for each kind of packets when a LAN apparatus transmits a packet, and this function assures the transmission of voice data even in case that data traffic is increased by specifying the ratio of channel band required by voice data.

In case that the priority control function possessed by a LAN apparatus used in a network configuration where a voice system and a data system are intermingled is insufficient, a band used by voice packets is secured by utilizing this function.

Next, the fragment function (or a fragmentation function) is a function which does not transmit a packet received by a LAN apparatus as keeping its original length but divides the packet into packets of a specified length and then transmits the divided packets.

However, there is the possibility that the use of this function gives a load to the process of a router and influences on the quality of voice due to delay and the like. This function is mainly used being limited to the case that another priority control is difficult in a WAN-system communication cf 1.5 Mbits/s or less in bandwidth.

For example, the number of fragment bytes in case that the channel service speed of an IP network is 64 to 256 kbits/s is determined as the defined value of fragment (hereinafter, referred to as an A value) by adding the number of bytes necessary for a protocol header of FR, PPP and the like to either size of a voice packet size or a fax packet size. The determination is performed in such a manner as "The number of fragment bytes in case of 384 kbits/s is not less than the A value and not larger than 360 bytes", "The number of fragment bytes in case of 512 kbits/s is not less than the A value and not larger than 480 bytes", "The number of fragment bytes in case of 1024 kbits/s is not less than the A value and not larger than 960 bytes", and "The number of fragment bytes in case of 1536 kbits/s needs no determination of fragment".

Next, the fluctuation absorbing function is described. In an IP network, delay occurs from various causes and variation (fluctuation) in interval between arrivals of packets occurs. It is known that when at the time of converting a voice IP signal into a voice signal the voice IP signal is reproduced as keeping this fluctuation as it is, the quality of voice is deteriorated. In order to absorb the fluctuation, therefore, a voice-IP conversion circuit (a built-in circuit of TU portion 1b or IP-MFT 62) is provided with a fluctuation absorbing buffer.

As a fluctuation absorbing method, there are an automatic fluctuation absorbing method following the state of fluctuation and a fixed fluctuation absorbing method absorbing fluctuations in fixed width, which are determined according to the number of fluctuation absorbing buffers (delay time) and set-up information.

In a fluctuation absorbing mechanism of TU portion 1b, a voice IP signal from a LAN side is received by a LANIF circuit for interfacing with a LAN in TU portion 1b and then fluctuation of it is absorbed by the fluctuation absorbing buffer and thereafter the voice IP signal is converted by a CODEC into a voice signal. Conversely, a voice signal from a conventional interface (COT or LINE) is converted by the CODEC into a packet and is transmitted by the LANIF circuit to a LAN (IP-MFT and the like) as a voice IP signal. Each of PU portion 13 and VIDP 15 has these LANIF circuit, a fluctuation absorbing buffer and a CODEC.

Next, TM portion 1a is provided inside it with an IP call control portion 14 (hereinafter, referred to as an SC portion) for performing a call control with a LAN or an IP.

Network 4 and an exchange control portion 12 (hereinafter, referred to as a CC portion) for performing a data exchange control of each of EX portion 11, SC portion 14 and PU portion 13.

The CC portion 12 for performing an exchange control of each of EX portion 11, SC portion 14 and PU portion 13 has, a function of managing an IP address to be assigned to each of IP-MFT 62 and PU portion 13 and reporting the IP address of an opposite party.

CC portion 12 converts a telephone number reported from EX portion 11 and an IP address being an address in a packet network 4 into each other (it is necessary to determine in advance telephone numbers and IP addresses to be converted) and controls the connection between PSTN 8 and packet network 4 through the SC portion 14.

That is to say, the communication between terminals connected to PSTN 8 and packet network 4 results in being connected by an equivalent function to what is called a direct-in-line (DIL) method in an incoming function of a conventional exchange.

A plurality of SC portions 14 can be also mounted, and can be also installed more according to the terminal connecting capability of SC portion 14 and connected to another network of a plurality of SC portions.

The SC portion 14 performs a call control with IP network 4. The SC portion 14 has a CC interface portion 144, a protocol conversion portion 142, an original interface portion 143, a PU control portion 146, and a LAN interface portion 145. The CC interface portion 144 performs a data communication control with CC portion 12, is connected to a protocol conversion portion 142, a specific interface portion 143, a PU control portion 146 and a maintenance control portion 147 (described later) and performs a message communication control between these portions and the CC portion 12. The protocol conversion portion 142 is connected to the CC interface portion 144, performs an interoffice service by means of SS7 signaling, converts a call control message sent from the CC portion 12 into an H.323 call control message and enables communication with terminals adapted to H.323. The specific interface portion 143 is connected to the CC interface portion 144 in the same manner and interfaces with IP-MFT 62 communicating with the exchange 1 by means of a specific protocol. The PU control portion 146 has a function of converting specific message reported from CC portion 12 into IP data and reports them to PU portion 13 and reports a message reported from the PU portion 13 to the CC portion 12 for management control of a conventional channel. The PU control portion 146 also a function of performing an initial registration process associating a PKG number and an IP address with each other at the time of log-in from the PU portion 13 in order to manage the registration information of PU portion 13. The LAN interface portion 145 is connected to the protocol conversion portion 142, the specific interface portion 143, the PU control portion 146 and the maintenance control portion 147 in the same manner as the CC interface portion 144, performs a transmission or reception control of a message from them, being connected to HUB 2 and performs a transmission or reception process of IP packet data from the LAN side.

And the protocol conversion portion 142 has an H.225 call control function of performing a call control process with a terminal adapted to H.323 and an H.245 message control function of performing a compatibility confirming process between terminals according to an H.245 procedure in case that a standard procedure and the like are connected in a state where media paths are not established.

And making a call to an apparatus which has come to be in a state where it cannot be connected is controlled by always monitoring the status of an opposite-side terminal connected to a LAN side by means of a Ping command and thus a wasteful call control process is not performed. The monitoring method sends a Ping command to an opposite party at regular intervals, and detects and reports the occurrence of a channel abnormality and the recovery from abnormality to CC portion 12. The condition judged as a Ping abnormality includes that the resultant data in response to a Ping command is abnormal, that an opposite party does not respond to a Ping command and that a socket used in sending out a Ping command is abnormal. The IP address of an opposite party is an IP address obtained from data registered as office data through the CC portion 12.

Next, the specific interface portion 143 is provided with a registered information managing function of associating an extension number with an IP address at the time of log-in from IP-MFT 62 and managing the resultant information, a connection information managing function of managing the channel connection information (a port number, the number of multiplexed packets, a coding method and the like) of each call of IP-MFT 62 at all times and using this information for notification of connection condition at the time of speech path connection, a status managing function of confirming the normality of a registered IP-MFT 62 and always reporting the latest status of the IP-MFT 62 to CC portion 12, and a control message function of performing a transmission or reception process of a call control message with an IP-MFT 62.

As for a data form in exchange 1, when the protocol conversion portion 142 and the specific interface portion 143 transmit data from the CC portion 12 to the LAN interface portion 145, the data transmitted respectively by the protocol conversion portion 142 and the specific interface portion 143 are converted into IP packets.

Concretely, when data is transmitted from the protocol conversion portion 142 to the LAN interface portion 145, the device-specific data is converted into H.323 data or No.7 data and then converted into a packet, and when data is transmitted from the specific interface portion 143 to the LAN interface portion 145, the device-specific data is converted into specific data capable of being used by IP-MFT 62 in the specific interface portion 143, and then converted into a packet and transmitted.

Data between CC portion 12 and SC portion 14 is device-specific data, but since using No.7 signal information as it is provides a high efficiency of conversion for call control information, it is preferable that a device-specific message and a No.7 message are used in duplicate.

And when the protocol conversion portion 142 and the specific interface portion 143 receive and transmit IP packet data from the LAN interface 145 to the CC interface portion 144, the protocol conversion portion 142 and the specific interface portion 143 remove packet frames and convert the respective received data into device-specific data and transmit them to the CC portion 12.

Next, a typical calling procedure according to the present invention is described with reference to FIG. 1.

The case that a general telephone (not illustrated) connected to PSTN 8 makes a call to an IP telephone 61 connected to HUB 2 is taken as an example.

When a general telephone makes a call, its call control information is received by TU portion 1*b* through PSTN 8. The TU portion 1*b* reports the call to TM portion 1*a* in order to identify the opposite party to be connected on the basis of dial information from the calling party.

When the TM portion 1*a* receives the call control information from the TU portion 1*b*, the TM portion 1*a* judges which facilities provide service for the area corresponding to the telephone number inputted by the calling party and, in case that the opposite party to be connected is an IP telephone 61 using a packet network such as the Internet, converts the call control information into the form of call control and communication data compatible with the opposite party's interface and communicates the converted information with the called party.

The TM portion 1*a* can monitor the status of calling/busy/answer of the called party and can notify the calling party of the status of call so as to be able to notify the calling party of the status of call by reproducing a ring-back tone. When the call has been responded to through the IP telephone 61, the TM portion 1*a* stops reproducing a ring-back tone to the calling party.

And PU portion 13 in the TU portion 1*b* compresses voice data inputted from the telephone of the PSTN 8 side and converts the compressed input voice data into packet data, and starts transmitting the packet data to the IP telephone 61 connected to HUB 2. On the other hand, at the same time it receives the input packet data from the IP telephone 61 and expands voice data, and the expanded voice is reproduced and outputted to the telephone connected through PSTN 8.

During this data communication (call), the TU portion 1*b* performs an A/D conversion or D/A conversion in data conversion, encryption/decryption, voice compression/expansion, and an echo canceling process to be performed so as to prevent the same data signal as a data signal to be outputted to the respective telephones from being sent back to the respective speakers.

The above-mentioned two speakers converse with each other as usual until one speaker rings off. When the disconnection of a channel is detected by the exchange 1, a detailed record of a call capable of being applied to an optional telephone rate (the duration of a call, the number of transmitted packets and the like) is made.

In such a way, the TM portion 1*a* processes and manages all data related to a call control, while the TU portion 1*b* performs a conversion process of other voice data and the like. The calling party's address or the called party's address of data to be transmitted or received by the TU portion 1*b* is specified by the TM portion 1*a*.

As a second embodiment, the case that IP-MFTs 62 connected to HUB 2 makes a call to each other is described.

In case that an IP-MFT 62*a* and an IP-MFT 62*b* connected to HUB 2 communicate with each other, call control information from the IP-MFT 62*a* to the IP-MFT 62*b* is sent to the specific interface portion 143 via the HUB 2 and the LAN interface portion 145 in the SC portion 14. (The reason is that exchange 1 and IP-MFT 62 each use a connection method according to a specific procedure.) The specific interface portion 143 transfers call control information being a specific message to the CC portion 12 through the CC interface portion 144.

The CC portion 12 judges what the call control information from the IP-MFT 62*a* requests to be connected to, recognizes that it is a connection request to the IP-MFT 62*b* and sends the call control information to the specific interface portion 143 through the CC interface portion 143 in the SC portion 14. The specific interface portion 143 which has received the call control information sends the call control information being a specific message to the IP-MFT 62*b* through the LAN interface 145 and HUB 2.

Communication data from the IP-MFT 62*a* is sent out to the IP-MFT 62*b* through HUB 2. Communication data from the IP-MFT 62*b* is also sent by way of a similar route to it.

When the calling party is IP-MFT 62*b*, call control information is transmitted to the IP-MFT 62*a* through a transmission route in reverse order to the above.

As a third embodiment, the case that an IP-MFT 62 and an IP telephone 61 connected to HUB 2 communicate with each other is described.

Call control information from IP-MFT 62 to IP telephone 61 is sent to the specific interface portion 143 via HUB 2 and the LAN interface portion 145 in the SC portion 14. The specific interface portion 143 removes the IP packet frame from the call control information being a specific message and sends the call control information to the CC portion 12 through the CC interface portion 144.

The CC portion 12 judges what the call control information from the IP-MFT 62 requests to be connected to, recognizes that it is a connection request to the IP telephone 61 and transfers the call control information to the protocol conversion portion 142 through the CC interface portion 143 in the SC portion 14. The protocol conversion portion 142 which has received the call control information being a device-specific message converts the call control information into call control information being an H.323 message and then converts it into an IP packet and sends it to the IP telephone 61 through the LAN interface 145 and HUB 2.

Communication data from the IP-MFT 62 is sent out to the IP telephone 61 through HUB 2. Communication data from the IP telephone 61 is also sent by way of a similar route to it.

When the calling party is an IP telephone 61, call control information is transmitted to IP-MFT 62 through a transmission route in reverse order to the above. As described above, the message communication between SC portion 14 and CC portion 12 is performed in a device-specific message form, and the message communication between SC portion 14 and HUB 2 is performed in an IP packet data message form. Particularly, the message communication between exchanges (between offices) by way of an IP network 4 uses a No.7 message converted into IP packet data, said No.7 message being a message effective for transferring various information in a similar manner to a conventional manner.

Hereupon, a No.7 common channel signaling system for transferring a No.7 message is described. A system transmitting information for controlling a telephone exchange (a control signal) by means of a channel other than a user information channel in case of forming a telephone/ISDN network is called a common channel signaling system.

A control signal is a signal necessary for performing connection between exchanges, and performs such information transfer as transfer of an opposite party's (incoming) number for connecting communication, notification of response of the incoming side, notification of the end of communication and the like. The No.7 common channel signaling system is a common channel signaling system (Recommendations Q.700 Series) which ITU-T (International Telecommunication Union, Telecommunication Standardizing Division) has studied and recommended as a common channel signaling system adapted to a digital network. This can be used for various applications including not only telephone exchange, data exchange and ISDN communication but also the remote control of an exchange, the management of maintenance or operation of a network and the like.

The No.7 common channel signaling system has a different user part depending on applications using this system. It uses a telephone user part (TUP) in telephone connection and uses an ISDN user part (ISUP) in ISDN.

As features of the No.7 common channel signaling system, there are abundant kinds of signals, ability of signal transfer during conversation, ability of high-speed transfer of signals, ability of the same control of telephone service as that of non-telephone service and the like.

FIG. 3 shows a table of No.7 messages.

Describing typical messages, IAI message 120 is an address signal with additional information, and is sent first at the time of setting up a call in the same way as AIM (address signal) and is a signal being provided with caller information, call type and the like in addition to selected numeral (dial or the like) information and information about call connecting conditions.

ACI message 121 is an address completion signal with additional information, said signal showing that all address information necessary for called connection has been received in the same way as an ACM (address completion signal) message and being additionally provided with called party information.

AND message 122 is an answer signal with additional information, said signal having answering subscriber information added when a called subscriber answers and being sent to the calling office side.

CLF message 123 is a disconnect signal showing that a call in course of being set up or of conversation has ended, and ordinarily is sent at the time of recovery of a calling party but is also sent at the time of reception of an RSC message (channel reset signal).

RLG message 124 is a recovery completion signal showing that a channel corresponding to a disconnect signal or a channel reset signal has become free.

SSB message 125 is a subscriber busy signal showing that a called subscriber is busy.

Next, FIG. 4 shows a table of H.323 messages (H.225 call control message information).

Typical call set-up messages and call end messages are described. First, Alerting 130 being a call set-up message is a signal showing a call and Call Proceeding 131 is a signal showing call set-up reception. And Connect 132 shows answer, Connect Acknowledge 133 shows answer confirmation, Progress 134 shows progress display, Setup 135 shows call set-up, and Setup Acknowledge 136 shows call set-up confirmation.

Next, Disc 137 being a call end message shows disconnection, Release 138 shows release, and Release Complete 139 shows release completion.

FIG. 5 shows a conversion correspondence table of conversion between No.7 messages and H.323 (H.225) messages.

As shown in FIG. 5, this makes mutual conversions correspond to each other in such a way that an address signal with additional information (IAI) being a No.7 message and a call set-up signal (Setup) (140) being an H.323 message, an address completion signal with additional information (ACI) being a No.7 message and a calling signal (Alert) (141) being an H.323 message, and an answer signal with additional information (AND) being a No.7 message and an answer signal (Connect) (142) being an H.323 message, respectively, correspond to each other.

Figure 6:
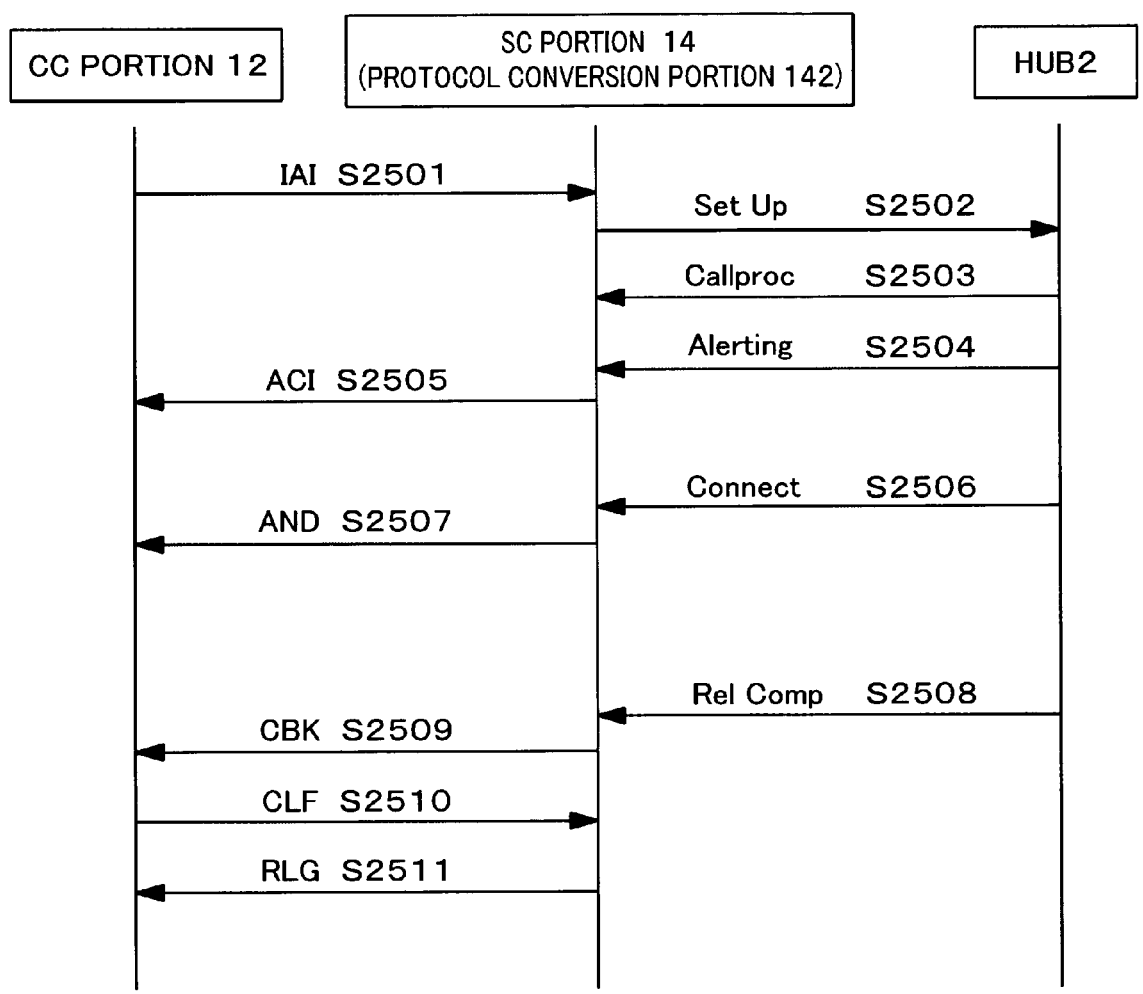
FIG. 6 is a sequence diagram showing a message converting operation of a protocol conversion portion.

FIG. 6 shows the operation sequence of conversion processing (conversion between No.7 messages and H.323 messages) of the protocol conversion portion 142 in outgoing and incoming calls.

In case that an exchange connected to an IP network 4 side not illustrated makes a call to an IP telephone 61, packet data of call control information and the like from said exchange are received by the CC portion 12 by way of the IP network 4, HUB 2 and the specific interface portion 143. The received call control data being a No.7 message (being a specific message transmitted by the TU portion 1b in case that the calling party is a telephone 5) is transferred to the protocol conversion portion 142 and the protocol conversion portion 142 converts it into an H.323 message and transfers it to the IP telephone 61.

FIG. 6 shows a first example in case of outgoing. When receiving IAI being dial information from the CC portion 12 (S2501), the SC portion 14 converts it into Setup being a call set-up message and sends out it to the HUB 2 side (S2502). When the protocol conversion portion 142 has received Call-proc (S2503) being a call set-up reception message and Alerting (S2504) being a calling message from the HUB 2 side, the protocol conversion portion 142 converts them into ACI as dial completion and sends it to the CC portion 12 (S2505). When Connect (S2506) being an answer message is sent from the HUB 2 side, the protocol conversion portion 142 converts it into AND and sends it to the CC portion 12 (S2507).

Coming into a communication state, the protocol conversion portion 142 which has received Rel Comp (S2508) being a release completion message from the HUB 2 converts it into CBK (S2509) being a clearing signal and sends it to the CC portion 12. The CC portion 12 which has received the CBK sends a disconnect signal CLF (S2510) to the protocol conversion portion 142, and the protocol conversion portion 142 sends a recovery completion signal RLG (S2511) to the CC portion 12 and the communication ends.

Figure 7:
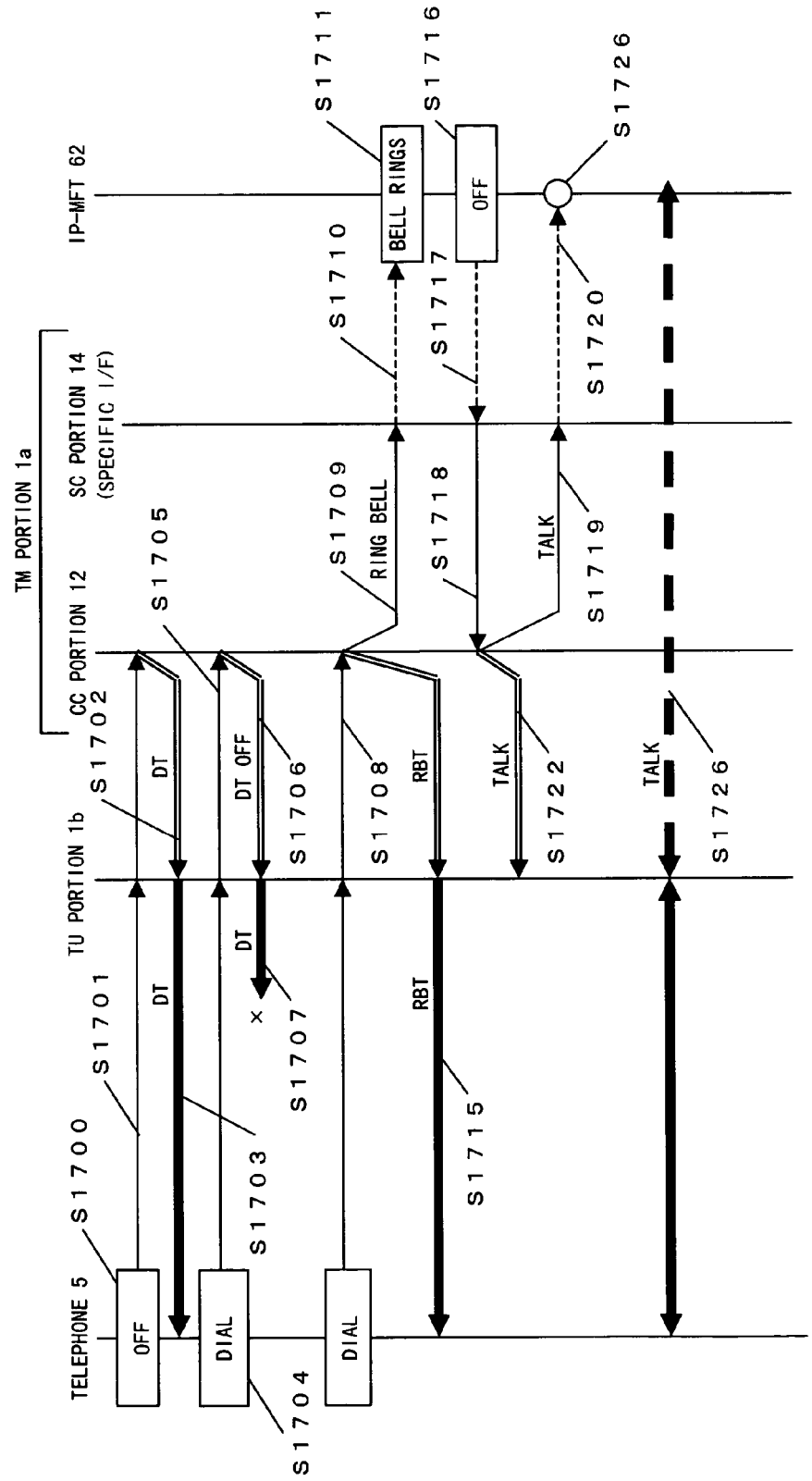
FIG. 7 is a sequence of connection between terminal apparatuses through an exchange of the present invention.
Figure 8:
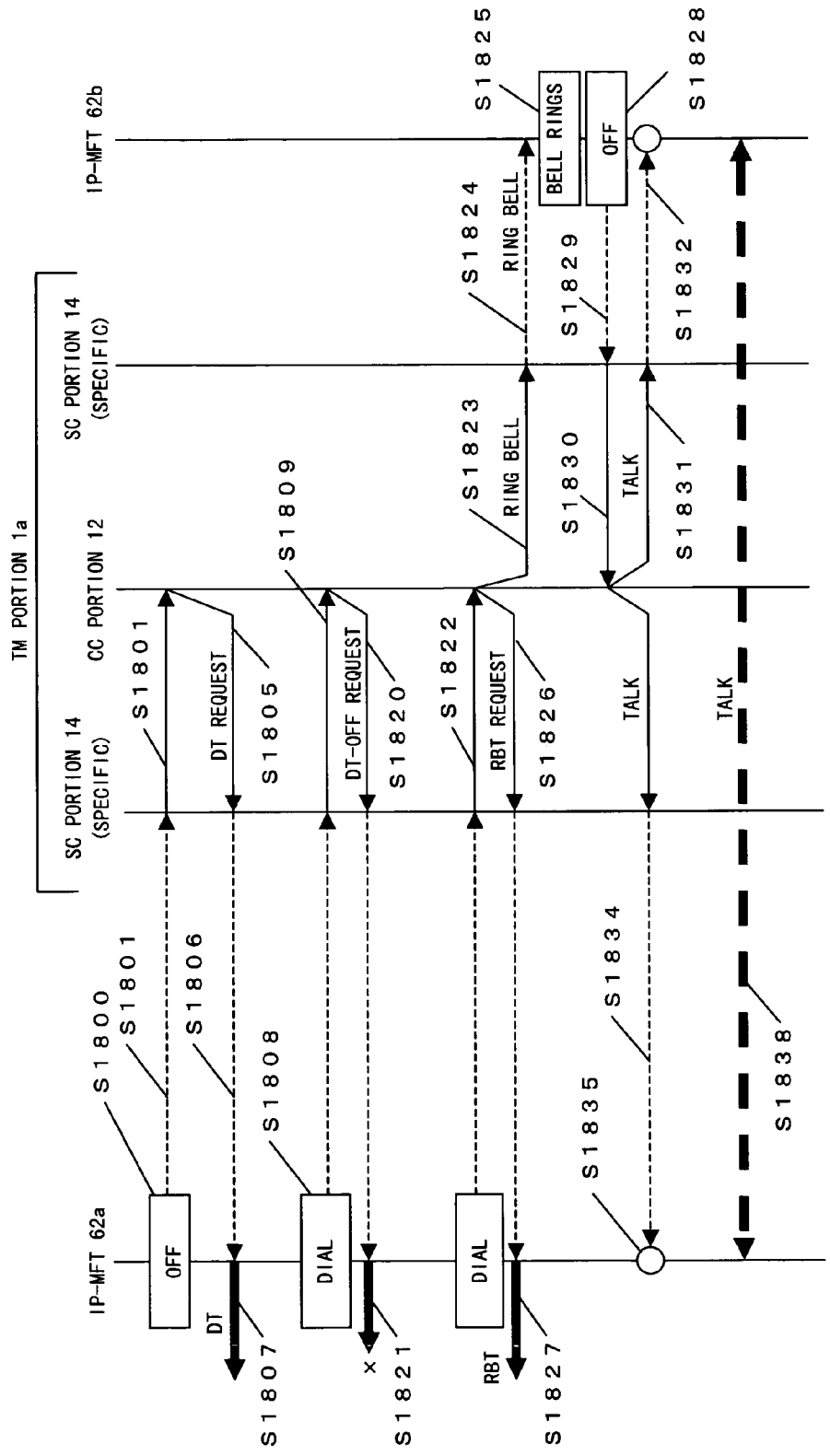
FIG. 8 is a sequence of connection between terminal apparatuses through an exchange of the present invention.
Figure 9:
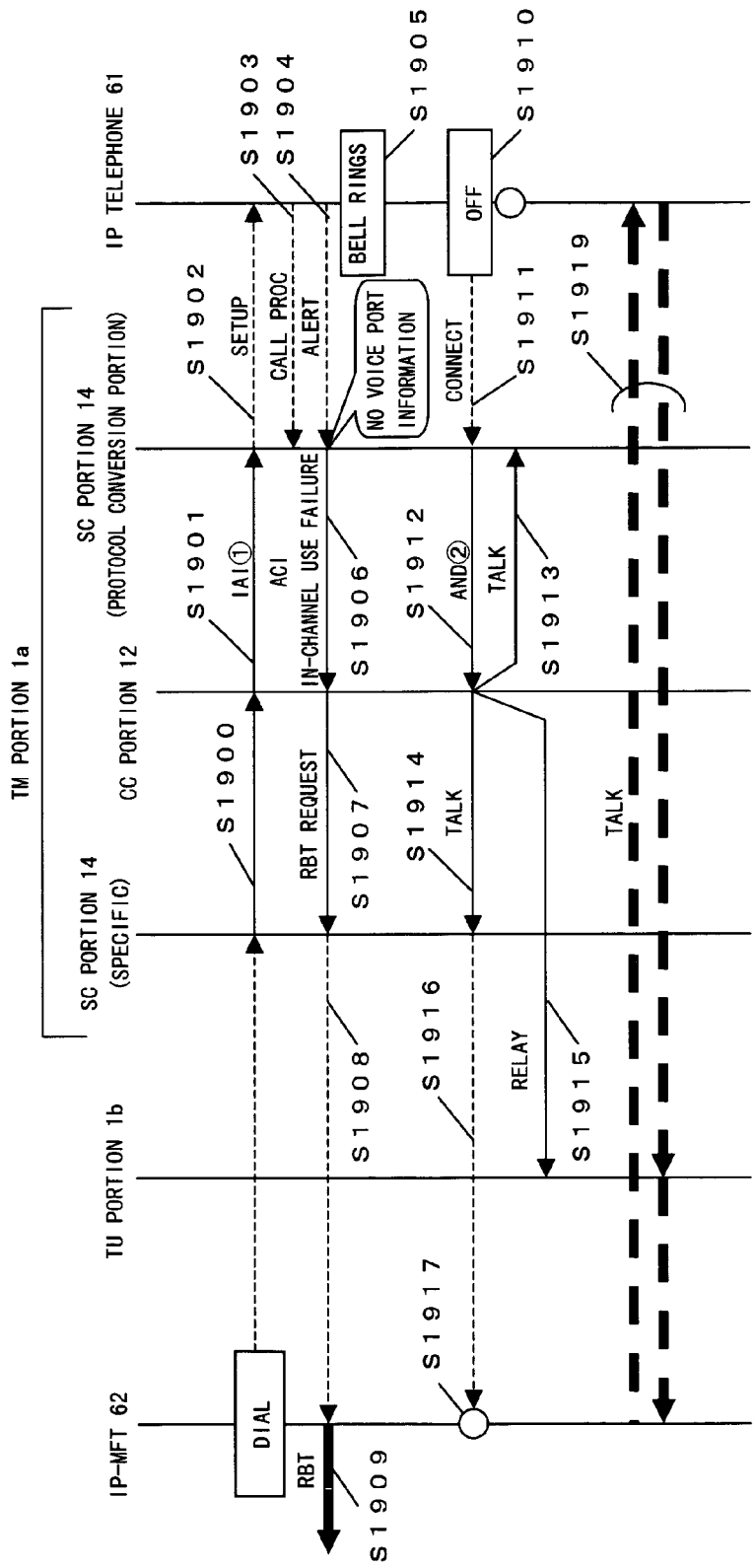
FIG. 9 is a sequence of connection between terminal apparatuses through an exchange of the present invention.

FIGS. 7 to 9 each show a connection sequence between terminal apparatuses by way of an exchange 1.

FIG. 7 shows a connection sequence between a telephone 5 directly accommodated in the TU portion 1b and an IP-MFT 62 connected through a HUB 2 to the exchange 1.

When a telephone 5 is hooked off (S1700), this information is recognized by the TU portion 1b and is transferred to the CC portion 12 (S1701). The CC portion 12 which has received the off-hook information connects an unshown sound source trunk in the PU portion 13 to LINE 112 (S1702), and makes a dial tone outputted from the sound source trunk flow in the telephone 5 (S1703). The sound source trunk is a part generating a sound such as a dial tone, a ring-back tone and the like.

The telephone 5 which has received a dial tone and recognized the exchange 1 has been activated starts a dial transmission for connection (S1704). The CC portion 12 which has received the first dial via EX portion 11 and PU portion 13 (S1705) disconnects the sound source trunk from LINE 112 and instructs the TU portion 1b to stop sending the dial tone, and sending the dial tone is stopped (S1706 and S1707).

The CC portion 12 which has received the final dial (S1708) recognizes an opposite party to be connected from the dial information and instructs the specific interface portion 143 in the SC portion 14 to make the opposite party to be connected ring the bell (S1709). The instructed specific interface portion 143 transmits a specific message (an IP packet type call control message) to the IP address of an IP-MFT 62 and requests the bell to be rung (S1710).

According to this request, the IP-MFT 62 rings its own calling bell (S1711). At the same time as this, the CC portion 12 controls TSW 113 to connect an unshown sound source trunk with LINE 112 (S1714) to output a ring-back tone to the telephone 5 (S1715). By receiving this, the telephone 5 recognizes a state of calling the opposite party.

Hereupon, when the IP-MFT 62 is hooked off (S1716), this information is sent in an IP packet type specific message to the specific interface portion 143 in the SC portion 14 (S1717) and transferred to the CC portion 12 (S1718). The CC portion 12 which has received it returns a message that the telephone 5 and the IP-MFT 62 converse with each other to the specific interface 143 by return (S1719), and the specific interface portion 143 transfers this information in an IP packet type specific message to the IP-MFT 62 (S1720). Due to this information, the IP-MFT 62 comes into a state where IP packet data can be transmitted and received (hereinafter, referred to as a channel open state) and the preparation for conversation is completed (S1721).

And at the same time as the above operation, the CC portion 12 instructs the TU portion 1b to connect LINE 112 in the EX portion 11 and the PU portion 13 to each other (S1722) and the preparation for conversation of the exchange 1 is completed.

After this, conversation data is transmitted as IP packet voice data from the IP-MFT 62 to the PU portion 13 (the destination is the PU portion 13 and the originating party is the IP-MFT 62) and is converted into PCM voice data by the PU portion 13 and then transmitted to the telephone 5 by way of LINE 112 in the EX portion 11 (S1726)

Analog voice data from the telephone 5 is received by the EX portion 11 and then is sent to the PU portion 13 and converted into IP packet voice data by the PU portion 13 (the destination is the IP-MFT 62 and the originating party is the PU portion 13), and is transmitted to the IP-MFT 62.

FIG. 8 shows a connection sequence between IP-MFTs (a) and (b) connected through HUB 2 to the exchange 1.

When an IP-MFT 62(a) is hooked off (S1800), this information is sent out as an IP packet type call control message and recognized by the specific interface portion 143 in the SC portion 14 (S1801) and is transferred to the CC portion 12 (S1802). The destination IP address of this message to the SC portion 14 is the SC portion 14 and the calling party IP address is the IP-MFT 62a.

At the same time, the CC portion 12 sends a dial tone output request to the IP-MFT 62 (a) by way of the SC portion 14 (S1805 and S1806). The IP-MFT 62(a) which has received the dial tone output request generates and outputs a dial tone from the ear receiver in order to make the speaker hear the dial tone (S1807).

The speaker of the IP-MFT 62(a) which has received a dial tone and recognized the exchange 1 (TM portion 1a) has been activated starts a dial transmission for connection (S1808).

The CC portion 12 which has received the first dial via the SC portion 14 (S1809) sends a dial tone stop request to the IP-MFT 62(a) via the SC portion 14 (S1820) and stops output of the dial tone from the IP-MFT 62(a) (S1821).

The CC portion 12 which has received the final dial (S1822) recognizes an opposite party to be connected from the dial information and instructs the specific interface portion 143 in the SC portion 14 to make the opposite party to be connected ring the bell (S1823). The instructed specific interface portion 143 transmits a packet type specific message to the IP address of an IP-MFT 62 (b) (the IP address of the transmitter side is the SC portion 14) and requests the IP-MFT 62(b) to ring the bell (S1824).

According to this request, the IP-MFT 62(b) rings its own calling bell (S1825). At the same time as this, the CC portion 12 performs a ring-back tone output request to the IP-MFT 62(a) through the SC portion (S1826), and according to this request the IP-MFT 62(a) outputs a ring-back tone (S1827).

Hereupon, when the speaker of the IP-MFT 62(b) takes up the ear receiver (hooks off) (S1828), the information being an IP packet type specific message which includes the destination IP address representing the SC portion 14 and the source IP address representing the IP-MFT 62(b), this information is received as an IP packet type specific message by the specific interface portion 143 in the SC portion 14 (S1829) and is transferred to the CC portion 12 (S1830). The CC portion 12 which has received it returns a message (added the IP address of the IP-MFT 62(b) being the opposite party) that the IP-MFT 62(a) and the IP-MFT 62(b) converse with each other to the specific interface 143 in the SC portion 14 by return (S1831), and the specific interface portion 143 transfers this information as a specific message to the IP-MFT 62(b) (S1832). Due to this information being received, the IP-MFT 62(b) comes into a channel open state and the preparation for conversation is completed (S1833).

At the same time as the above operation, the CC portion 12 transfers a message to the IP-MFT 62(a) by using the specific interface 143 in the SC portion 14. This message is added the IP address of the IP-MFT 62(a) being the opposite party to represent to the IP-MFT 62(a) and the IP-MFT 62(b) to allow them to converse with each other. Then, the IP-MFT 62(a) also completes the preparation for conversation (S1834 and S1835).

After this, conversation data is transferred only as IP packet voice data between the IP-MFT 62(a) and the IP-MFT 62(b) by way of the LAN (S1838). Voice data from IP-MFT 62(a) to IP-MFT 62(b) at this time has the IP address of the IP-MFT 62(b) as its destination and the IP address of the IP-MFT 62(*a*) as an originating side IP address, and voice data from IP-MFT 62(*b*) to IP-MFT 62(*a*) has a similar form also.

FIG. 9 shows a connection sequence between an IP-MFT 62 and an IP telephone 61 connected through HUB 2 to the exchange 1.

Since the sequence from the time when an IP-MFT 62 is hooked off to the time when dialing is started is the same as FIG. 8, the description is omitted.

The CC portion 12 which has received dial information by means of a specific message by way of the specific interface portion 143 in the SC portion 14 (S1900) sends the dial information to the protocol conversion portion 142 in the SC portion using IAI being an address signal with additional information of a No.7 message (S1901). This call control message has the IP address of the PU portion 13, the IP address, port number information and the like of the IP telephone being the destination used in voice data communication stored in it.

The protocol conversion portion 142 which has received it converts the IAI message into SETUP being a call set-up request of an H.323 message according to a conversion table shown in FIG. 5 and transfers it as IP packet data to the IP telephone 61 (S1902). And this SETUP message has the IP address of the SC portion 14 as the originating side, the IP telephone 61 as its destination and the IP address of the IP telephone 61 as the called party's number in the Setup message.

The IP telephone 61 which has received SETUP performs a call set-up reception process, returns a CALL PROC (in course of call set-up processing) message and an ALERT (in course of calling) message of an H.323 message form to the SC portion 14 and rings its own calling bell (S1903, S1904 and S1905). And the destination of an answer message such as a CALL PROC and the like is the IP address of the SC portion 14.

The protocol conversion portion 142 in the SC portion 14 which has received ALERT converts the ALERT message into ACI being an address completion signal with additional information of a No.7 message according to the preceding conversion table and further transfers it together with IP packet voice transmission disable information (hereinafter, referred to as in-channel use disable information) to the CC portion 12.

The in-channel use disable information is a message sent in case that a ring-back tone cannot be transmitted from an opposite apparatus to an IP-MFT 62 and makes an opportunity to transmit a ring-back tone output request to the IP-MFT 62. In case that an opposite apparatus can transmit a ring-back tone (of IP packet type) to an IP-MFT 62, IP packet voice transmission enable information (hereinafter, referred to as in-channel use enable information) described later is used.

The CC portion 12 which has received this sends a ring-back tone output request to the IP-MFT 62 through the SC portion 14 (S1907), and the IP-MFT 62 which has received the ring-back tone output request outputs a ring-back tone (S1908 and S1909).

Hereupon, when the IP telephone 61 is hooked off (S1910), the IP telephone itself comes into a channel open state and the off-hook information is sent as an H.323 message to the H.323 interface 141 in the SC portion 14 (S1911).

This information is CONNECT of an answer message and is converted by the protocol conversion portion 142 in the SC portion 14 which has received it into AND (an answer signal with additional information) being a No.7 message and is transferred to the CC portion 12 (S1912). This call control message has such information as the IP address and port number of the opposite terminal (IP-MFT 62) and the compression method and the like stored in it.

The CC portion 12 which has received it returns a message that the IP-MFT 62 and the IP telephone 61 converse with each other to the protocol conversion portion 142 by return (S1913) and sends the same message also to the specific interface portion 143 in the SC portion 14 in order to send it to the IP-MFT 62 (S1914), and sends at the same time an IP packet voice relay message (hereinafter, referred to as a digital 1 link message) to the TU portion (S1915).

The specific interface portion 143 which has received the above message transfers this information as a specific message (the destination is the IP address of the IP-MFT 62 and the originating side is the IP address of the SC portion 14) to the IP-MFT 62 (S1916). Due to this information, the IP-MFT 62 comes into a channel open state and the preparation for conversation is completed (S1917).

After this, communication data is transmitted as IP packet voice data (the destination is the IP telephone 61 and the calling party is the IP address of the IP-MFT 62) from the IP-MFT 62 to the IP telephone 61 by way of HUB 2 (LAN), and communication data (the destination is the PU portion 13 and the calling party is the IP telephone 61) from the IP telephone 61 to the IP-MFT 62 is transmitted as IP packet voice (the destination is IP-MFT 62 and the originating side is the SC portion 14) by way of the PU portion 13 and HUB 2 (LAN) (S1919).

The reason why only voice data from IP telephone 61 to IP-MFT 62 is transferred through H.323 IP trunk 15 (hereinafter, referred to as VIPD) is as in the following. If an IP-MFT 62 transfers such voice data to another IP-MFT through no VIPD portion 15, an IP telephone 61 cannot send forward the voice packet data to the forwarding address without obtaining the forwarding IP address. Thereupon, if the communication is performed through VIPD portion 15, it is enough for the IP telephone 61 to send voice packet data to only the IP address of the VIPD 15 without obtaining the IP address of the forwarding IP address. The reason is that it is enough to only replace the destination of data received from the IP telephone 61 sent from the VIPD portion 15 with the forwarding IP address obtained from information which the IP-MFT 62 instructs the exchange 1 to transfer.

Figure 10:
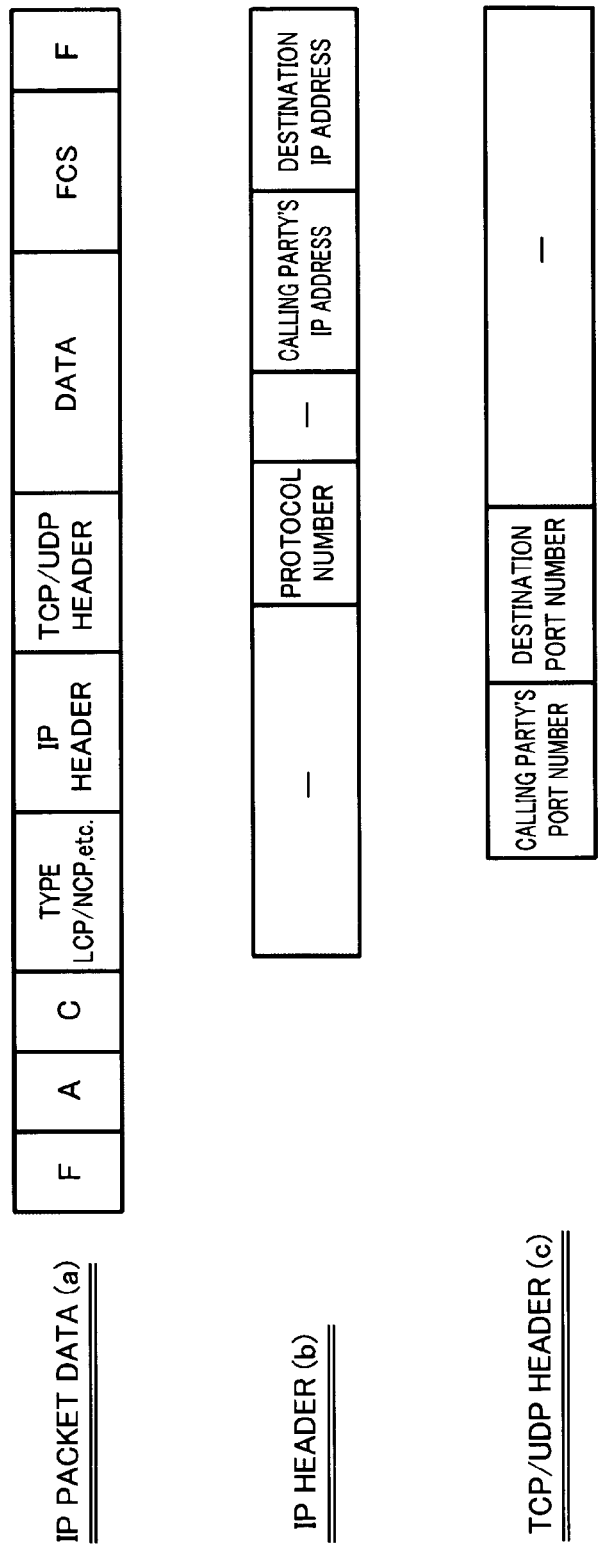
FIG. 10 shows the frame format of IP packet data.

FIG. 10 shows the frame format of IP packet data.

In FIG. 10, (*a*) is the format of IP packet data. And (*b*) shows the format of an IP header part in IP packet data and (*c*) shows the format of a TCP/UDP header part in IP packet data.

IP packet data transmitted or received by an IP telephone 61 or an IP-MFT 62 on a LAN have a format as shown in (*a*). IP packet data has a form in which there is a data part being an information part, and a TCP/UDP header part and an IP header part showing an IP packet are attached to the forward side of the data part and further a type part showing a type such as LCP/NCP and the like, a control (C) part and an address (A) part are placed and a flag (F) part is arranged at the forefront, and an FCS part is arranged at the backward side of the data part and a flag (F) part is attached to the backmost position. This is similar to what is generally called an HDLC frame format.

The TCP/UDP part shows either TCP or UDP being the kind of protocol of the transport layer in the TCP/IP protocol.

The IP header part (*b*) has a protocol number, the IP address of a calling party and the IP address of a destination stored in it, and the TCP/UDP header part (*c*) has the port number of a calling party and the port number of a destination stored in it.

As described above, according to the present invention, also in a packet switching network such as the Internet, it is possible to perform management of communication data such as checking whether or not a called number is a registered telephone number, connection of a call, providing status information such as a ring-back tone to a calling party, judging whether or not a called party has answered and the like, and thereby smoothly perform the connection between a conventional public network and a packet network.

And in case of building a system composed of a packet network only, it is possible to build a full-IP network by arranging only a TM portion for performing a call control, and in case of building a hybrid system accommodating a packet network and additionally office lines and analog extension telephones, it is possible to build the system by only installing additionally a TU portion for accommodating their channels. The TU portion can be installed more in number according to the number of channels and it is possible to flexibly cope with various systems ranging from a small-scale system to a large-scale system.

What is claimed is:

1. An exchange coupled to extension telephones, a public network, and a line concentrator and connecting an IP terminal unit to a packet network through the line concentrator, said exchange comprising:

a channel accommodating portion for accommodating said extension telephones, coupled to said public network, and transmission processing voice communication data between an extension telephone or said public network and an IP terminal unit; and a call control portion for integrally managing call control information related to the communication between said extension telephone and said IP terminal unit and controlling, based on the call control information, said channel accommodating portion to perform the transmission processing of said communication voice data, wherein (a) when a voice communication is performed between an extension telephone or said public network and an IP terminal unit:

said channel accommodating portion, when receiving call control information from said extension telephone or said public network, changes the call control information to a packet and transmits the packet to said call control portion through said packet network;

said call control portion, when receiving the call control information converted to the packet from said channel accommodating portion, according to the call control information, notifies said channel accommodating portion of a destination address of the voice communication data which said channel accommodating portion receives from said extension telephone or said public network;

said channel accommodating portion, when receiving the destination address from said call control portion, converts the voice communication data transmitted from said extension telephone or said public network to a packet, transmits the packet to said destination address, and performs the voice communication between said extension telephone or said public network and said IP terminal unit; or (b) when a voice communication is performed between two IP terminal units each other:

said call control portion, when receiving call control information from a IP terminal unit through said packet network, according to the call control information, notifies said IP terminal unit and an IP terminal unit as an opposite party of a destination address of said voice communication data, thereby performs the voice communication between said two IP terminal units.

2. An exchange according to claim 1, wherein when the number of said extension telephones or said public network increases, a plurality of channel accommodating portions can be added.

3. An exchange according to claim 1, wherein said call control portion, in case that the number of said extension telephones and said public networks to be accommodated is increased, connects a plurality of channel accommodating portions to said packet network and performs management of call control information with said plurality of channel accommodating portions and performs data transfer control.

4. An exchange according to claim 1, further comprising a call control portion transferring packet data received from one-side IP network adapted terminal connected with said packet network to a specified other-side IP network adapted terminal according to call control information received from said one-side IP network adapted terminal, and transferring packet data received from said other-side IP network adapted terminal to said one-side IP network adapted terminal.

5. An exchange according to claim 2, wherein said call control portion, in case that the number of said extension telephones and said public networks to be accommodated is increased, connects a plurality of channel accommodating portions to said packet network and performs management of call control information with said plurality of channel accommodating portions and performs data transfer control.

6. An exchange according to claim 2, further comprising a call control portion transferring packet data received from one-side IP network adapted terminal connected with said packet network to a specified other-side IP network adapted terminal according to call control information received from said one-side IP network adapted terminal, and transferring packet data received from said other-side IF network adapted terminal to said one-side IP network adapted terminal.

7. An exchange method for an exchange coupled to extension telephones, a public network, and a line concentrator and connecting an IP terminal unit to a packet network through the line concentrator, said exchange method comprising:

accommodating, via a channel accommodating portion, said extension telephones, coupled to said public network, and transmission processing voice communication data between an extension telephone or said public network and an IP terminal unit;

integrally managing, via a call control portion, call control information related to the communication between said extension telephone and said IP terminal unit and controlling, based on the call control information, said channel accommodating portion to perform the transmission processing of said communication voice data, wherein (a) when a voice communication is performed between an extension telephone or said public network and an IP terminal unit, the method further comprising:

receiving, by said channel accommodating portion, call control information from said extension telephone or said public network;

changing the call control information to a packet and transmitting the packet to said call control portion through said packet network;

receiving, by said call control portion, the call control information converted to the packet from said channel accommodating portion, notifying, according to the call control information, said channel accommodating portion of a destination address of the voice communication data which said channel accommodating portion receives from said extension telephone or said public network;

receiving, by said channel accommodating portion, the destination address from said call control portion, converting the voice communication data transmitted from said extension telephone or said public network to a packet, transmitting the packet to said destination address, and performing the voice communication between said extension telephone or said public network and said IIP terminal unit; and wherein, (b) when a voice communication is performed between two IP terminal units each other, the method further comprising:

receiving, by said call control portion, call control information from a IP terminal unit through said packet network, according to the call control information;

notifying said P terminal unit and an IP terminal unit as an opposite party of a destination address of said voice communication data; and performing the voice communication between said two IP terminal units.

8. An exchange method according to claim 7, wherein when the number of said extension telephones or said public network increases, the method further comprises adding a plurality of channel accommodating portions.

* * * * *